US011355003B1

(12) United States Patent
Bauchot et al.

(10) Patent No.: US 11,355,003 B1
(45) Date of Patent: Jun. 7, 2022

(54) INCIDENT LOCATION REPORTING USING ISODISTANCE

(71) Applicant: International Business Machines Corporation, Armonk, NY (US)

(72) Inventors: Frederic Bauchot, La Tourraque (FR); Zsolt Szalai, Tourrettes-sur-Loup (FR); Joel Viale, Vence (FR)

(73) Assignee: International Business Machines Corporation, Armonk, NY (US)

( * ) Notice: Subject to any disclaimer, the term of this patent is extended or adjusted under 35 U.S.C. 154(b) by 62 days.

(21) Appl. No.: 17/114,582

(22) Filed: Dec. 8, 2020

(51) Int. Cl.
*G08G 1/123* (2006.01)
*G08B 25/00* (2006.01)
*G01S 5/02* (2010.01)
*G01S 5/00* (2006.01)
*G08G 1/0967* (2006.01)

(52) U.S. Cl.
CPC .......... *G08B 25/009* (2013.01); *G01S 5/0027* (2013.01); *G01S 5/0231* (2013.01); *G01S 5/0249* (2020.05); *G08B 25/004* (2013.01); *G08G 1/096791* (2013.01)

(58) Field of Classification Search
CPC ... G08B 25/009; G08B 25/004; G01S 5/0249; G01S 5/0027; G01S 5/0231; G08G 1/096791
USPC .......................................................... 340/992
See application file for complete search history.

(56) References Cited

U.S. PATENT DOCUMENTS

| | | | |
|---|---|---|---|
| 8,635,013 B2 | 1/2014 | Zuccotti et al. | |
| 9,170,334 B2 | 10/2015 | Baldwin et al. | |
| 9,327,743 B2 | 5/2016 | Green et al. | |
| 10,203,409 B2 | 2/2019 | Bueschenfeld et al. | |
| 2004/0001110 A1* | 1/2004 | Khan | G06T 15/20 715/848 |
| 2007/0150117 A1* | 6/2007 | Bitar | G08G 5/045 701/1 |
| 2009/0024321 A1* | 1/2009 | Bando | G01C 21/36 701/410 |
| 2011/0224900 A1* | 9/2011 | Hiruta | G01C 21/3469 701/533 |
| 2014/0162702 A1 | 6/2014 | Crawford et al. | |
| 2018/0231389 A1* | 8/2018 | De Nunzio | G01C 21/3446 |
| 2019/0236945 A1 | 8/2019 | Ye et al. | |
| 2020/0184687 A1* | 6/2020 | Gueniot | G06T 11/203 |
| 2020/0226853 A1 | 7/2020 | Ahmed et al. | |

FOREIGN PATENT DOCUMENTS

KR 20140110524 A 9/2014

* cited by examiner

*Primary Examiner* — Naomi J Small
(74) *Attorney, Agent, or Firm* — Gavin Giraud

(57) ABSTRACT

In a method for calculating a location of a traffic incident a processor receives a first alarm message. The alarm message has a device identification, an event time stamp indicating detection of an incident, and a first distance vector. The processor calculates first isodistance information from the first distance vector and receives a second alarm message that has the device identification, the event time stamp, and a second distance vector. The processor calculates a second isodistance information for the second alarm message, and calculates a location of the incident based on the first isodistance information and the second isodistance information.

20 Claims, 10 Drawing Sheets

INCIDENT LOCATION REPORTING USING ISODISTANCE

BACKGROUND OF THE INVENTION

The present invention relates generally to the field of localizing and reporting incidents, and more particularly to collaborative incident detection.

An incident may be considered any accident involving motor vehicles, pedestrians, bicyclists, or other travelers on a road, which results in an event that contrasts with expected, intended, or routine operation. For incidents involving injury or other safety concerns, response by incident response teams or government safety authorities may improve the likelihood of recovery. In order to respond, the incident response teams and government safety authorities need to have accurate geolocation for the incident. Geolocation of an incident involving a motor vehicle, bicyclist, pedestrian, etc., however, often requires the availability of a satellite location or navigation system (e.g., GPS receiver) for geolocating the event.

SUMMARY

Aspects of an embodiment of the present invention disclose a method, computer program product, and computing system for calculating a location of a traffic incident. A processor receives a first alarm message. The alarm message has a device identification, an event time stamp indicating detection of an incident, and a first distance vector. The processor calculates first isodistance information from the first distance vector and receives a second alarm message that has the device identification, the event time stamp, and a second distance vector. The processor calculates a second isodistance information for the second alarm message, and calculates a location of the incident based on the first isodistance information and the second isodistance information.

DETAILED DESCRIPTION

Reporting and responding to incidents, in many instances, requires a long-range communication system for signaling the geolocated event to a remote service center. Not all motor vehicles, pedestrians, and bicyclists, however, have complete telematic equipment to enable stand-alone geolocation of an event. Some modern cars are installed with a long-distance antenna that is able to convey an emergency situation to a rescue center but not every vehicle, either motorized or not (e.g., bicycle), has such an antenna. The disclosed embodiments leverage calculations of isodistance to quickly and precisely identify and locate a vehicle that experiences an incident. A simple incident detection device is able to broadcast an alarm message that is received by potentially many similar devices and relayed to a long-distance antenna at a fixed location, and then to a consolidation center that calculates the incident location using isodistance information.

The present invention will now be described in detail with reference to the Figures.

Figure 1:
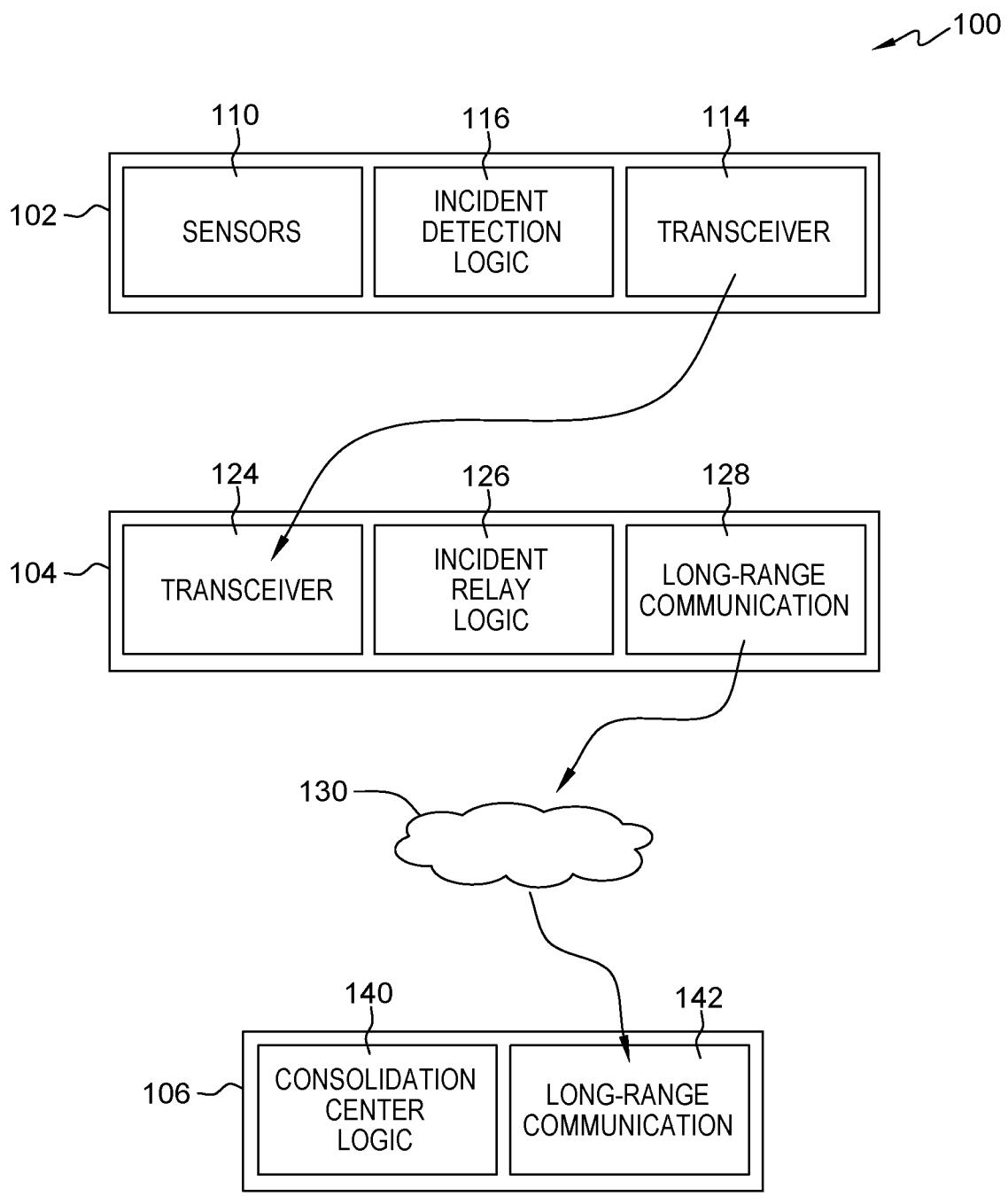
FIG. 1 depicts a schematic diagram of a system in accordance with one embodiment of the present invention.

FIG. 1 depicts an incident locating system 100 for communicating alarm messages and locating incidents while decreasing installation of incident relay devices. An alarm message can be sent from an incident detection device 102 to an incident relay device 104, and in turn to a consolidation center 106 (e.g., a server for consolidating signals from the other devices and notifying the proper authorities). The system 100 may include additional devices of each type for locating incidents over a broad area. The incident detection device 102 may be simple, self-contained mobile devices installed within a vehicle or carried around by a user. Many incident detection devices 102 may be circulated as part of the system 100 to bounce an alarm message between the incident detection devices 102 until communicating the alarm message to the incident relay device 104. For example, incident detection devices 102 may be installed within public transit vehicles in a city/state or installed on bicycles from a particular manufacturer.

The incident detection devices 102 may include sensors 110 for tracking conditions and detecting incidents. For example, the incident detection devices 102 may include a clock and an accelerometer that track time and acceleration of the incident detection device 102. In certain embodiments, the sensors 110 may include pressure or temperature sensors that detect conditions external to the incident detection device 102. The sensors 110 may detect the temperature or pressure of a components (e.g., tires, hoses, engine) within a vehicle, or may check a runner's body temperature. Additionally or alternatively, the incident detection device 102 may include a manual trigger mechanism (e.g., panic button) that a user may trigger to indicate that an incident has occurred. The incident detection device 102 also includes a transceiver 114 that communicates an alarm message over a short-range. This may be, for example, Bluetooth, ZigBee, infrared transmission, or dedicated short-range communication (DSRC). According to technology and emitted power, the range can be between 10 and 100 meters. Specifically, the alarm message may be transferred to other incident detection devices 102 that pass within range, or to the incident relay device 104. The alarm message is compiled and sent by an incident detection logic 116 as described below.

Figure 2:
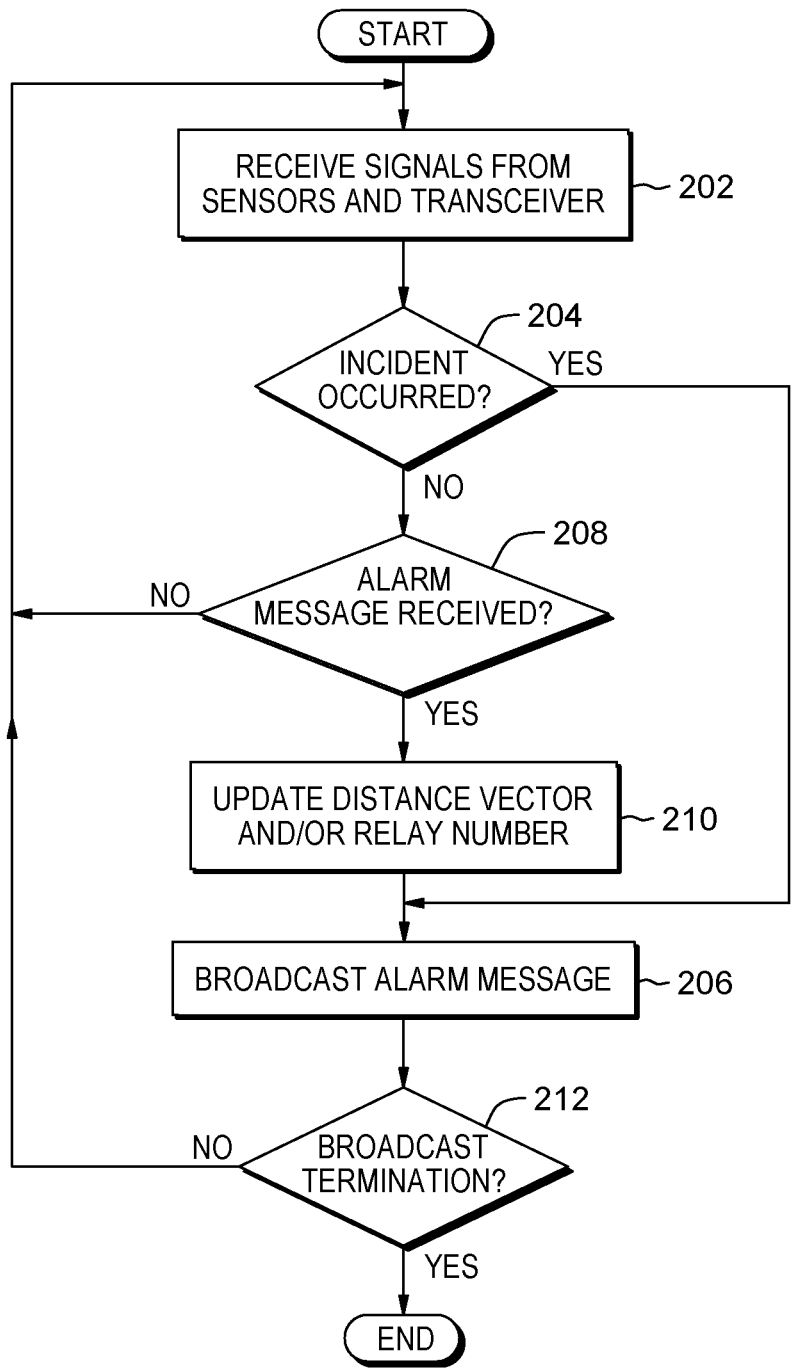
FIG. 2 depicts a flowchart of the steps of a incident detection logic executing within the system of FIG. 1, in accordance with one embodiment of the present invention.

FIG. 2 depicts a flowchart of the incident detection logic 116 executing on the incident detection device 102 of FIG. 1, in accordance with one embodiment of the present invention. While the incident detection device 102 travels around (e.g., with a vehicle or a bicyclist going to a destination) the incident detection logic 116 receives the signals from the sensors 110 (e.g., clock, accelerometer) and monitors for receiving an alarm message (block 202). The incident detection logic 116 also evaluates the signals from the sensors 110 and determines whether an incident has occurred (block 204). The incident detection logic 116 may determine an incident has occurred when signals from the sensors 110 are measured at values beyond a threshold. For example, if an accelerometer measures an acceleration higher/lower than an acceleration threshold range, the incident detection logic 116 may determine that a collision (i.e., an incident) has occurred. Additionally, the incident detection logic 116 may use a combination of signals (e.g., temperature and acceleration both outside of a threshold range) to determine that an incident has occurred. If the incident detection logic 116 does detect that an incident has occurred (block 204 "Yes"), then the incident detection logic 116 broadcasts an alarm message using the transceiver 114 (block 206). The alarm message may include identifying information for the incident detection device 102 (i.e., a device identification), an event time stamp indicating detection of an incident, a distance vector, and a relay number. For a newly broadcast alarm messages, the distance vector and relay number are zero but may be appended with new values as described below.

If the incident detection logic 116 does not determine that an incident has occurred (block 204 "No"), then the incident detection logic 116 will determine whether an alarm message has been received from a second incident detection device 102-1 (block 208). If the incident detection logic 116 does not determine that an alarm message has been received (block 208 "No"), then the incident detection logic 116 will return to the initial condition of receiving signals from the sensors 110 and the transceiver 114. If the incident detection logic 116 does determine that an alarm message has been received (block 208 "Yes"), then the incident detection logic 116 updates the alarm message with additions to the distance vector and the relay number (block 210) before broadcasting the alarm message (block 206).

The distance vector is updated with a distance traveled by the incident detection device 102-1 between an initiation time and a transmission time. The initiation time may be the time that the alarm message was received (not included in the alarm message, just used to track the distance vector). The incident detection device 102 receives the alarm message while traveling (i.e., without needing to pause or stop) and then continues uninterrupted to a destination. The distance included in the distance vector is derived by the incident detection devices 102 from the signals sent from an accelerometer. The accelerometer acts as a tachymeter and by integration as an odometer. In certain embodiments, the incident detection device 102 is installed in electrical connection to an external odometer that the incident detection device 102 accesses to determine the distance. After broadcasting the alarm message, the incident detection logic 116 determines whether broadcasting is terminated (block 212) and if not (block 212 "No"), the incident detection logic 116 repeats the process by updating the distance vector with the new distance traveled and broadcasting the updated alarm message using the transceiver 114. Broadcasting may be terminated (block 212 "Yes"), for example, when the incident detection device 102 stops moving, stops operation, or upon expiration of a timer.

If a second incident detection device 102 or a third incident detection device 102 receives the alarm message, the received distance vector will separately store the distances traveled by all the prior incident detection devices. The incident detection logic 116 will update the distance vector by appending the distance traveled by the latest incident detection device 102 to the rest of the values in the distance vector. Furthermore, if the alarm message is received by any intermediate incident detection device, the distance traveled by the intermediate incident detection device will be appended to the distance vector. As a non-limiting example, the alarm message received at a third incident detection device 102 may include:

(Device ID, event time stamp, {[first incident detection device distance]=0, [second incident detection device distance]}[relay]=1)

The incident detection logic 116 of the third incident detection device 102 will append to the distance vector, which becomes:

(Device ID, event time stamp, {[first incident detection device distance]=0, [second incident detection device distance], [third incident detection device distance]} [relay]=2)

The alarm message may also include a relay number at the end of the alarm message that increases incrementally for each incident detection device 102.

In the system 100 of FIG. 1, the alarm message is eventually received by one of the incident relay devices 104 of the incident locating system 100. The incident relay devices 104 are computing devices for relaying alarm messages between the incident detection devices 102 and the consolidation center 106. The incident relay devices 104 may therefore include a tower placed at a strategic fixed location so that many incident detection devices 102 may pass by, or a stationary car (e.g., a police car positioned at a location known and/or conveyed to the consolidation center 106) that has had long-range capability installed. The incident relay device 104 includes an incident relay logic 126 that receives alarm messages with a transceiver 124 and sends alarm messages with a long range communicator 128. The alarm message may be updated and sent with an additional field (i.e., relay ID) identifying the incident relay device 104. The alarm message is sent over a network 130 to a consolidation center 106 for location identification and notification, if necessary, to an emergency response service. The network 130 can be, for example, a telecommunications network, a local area network (LAN), a wide area network (WAN), such as the Internet, or a combination of the three, and can include wired, wireless, or fiber optic connections. The network 130 can include one or more wired and/or wireless networks that are capable of receiving and transmitting data, voice, and/or video signals, including multimedia signals that include voice, data, and video information. In general, the network 130 can be any combination of connections and protocols that will support communications between the consolidation center 106, and the incident relay devices 104 within the system 100. In various embodiments, the network 130 operates locally via wired, wireless, or optical connections and can be any combination of connections and protocols (e.g., personal area network (PAN), near field communication (NFC), laser, infrared, ultrasonic, etc.).

Figure 3:
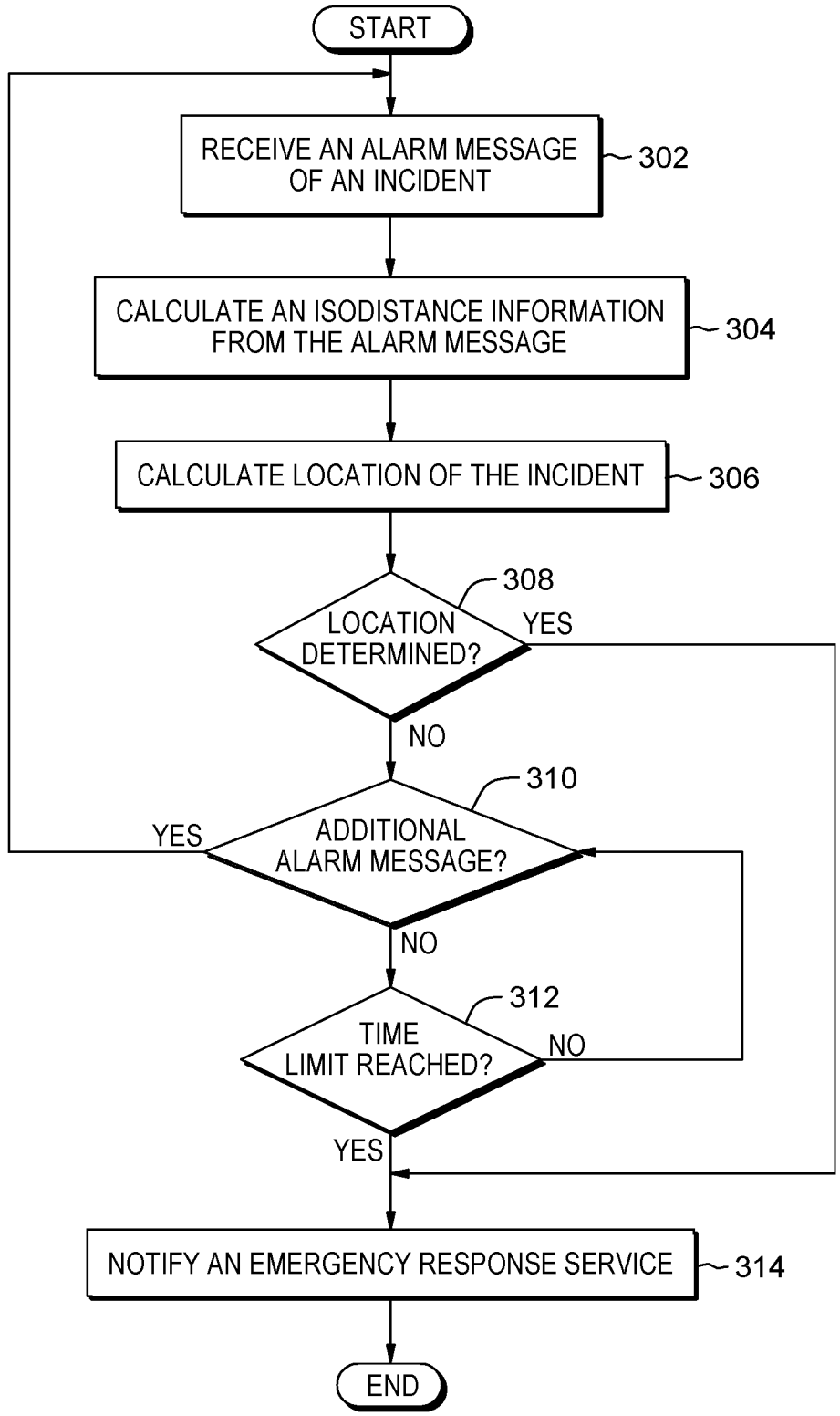
FIG. 3 depicts a flowchart of the steps of a consolidation center logic executing within the system of FIG. 1, in accordance with one embodiment of the present invention.

FIG. 3 depicts a flowchart of the steps of a consolidation center logic 140 executing within the system of FIG. 1, in accordance with one embodiment of the present invention. The consolidation center logic 140 receives an alarm message through a long-range communicator 142 from one of many fixed incident relay devices 104 through the wide area network 130 (block 302). As detailed above, the alarm message contains information about an incident detected by one of many incident detection devices 102. The consolidation center logic 140 uses the alarm message to calculate isodistance information from the message (block 304). Isodistance information represents the calculation of specific distance intervals from one point (i.e., the incident relay device 104) extending out along all the possible routes detected along paths of a map. With the isodistance information, the consolidation center logic 140 calculates a location of the incident (block 306). As shown in the examples below, the location may be determined from several possible locations that are narrowed down as more alarm messages are received by the consolidation center logic 140. If the location is determined (block 308 "Yes") then the consolidation center logic 140, in certain embodiments, may notify an emergency response service so that the incident may be addressed (block 314). If the location is not sufficiently certain (block 308 "No"), then the consolidation center logic 140 waits for additional messages to further narrow down the incident location (block 310). If there are additional messages (block 310 "Yes"), the consolidation center logic 140 repeats the process to calculate the location probability. If there are not additional messages (block 310 "No"), the consolidation center logic 140 waits for additional messages (block 312 "No") until the time limit is reached (block 312 "Yes"), at which point the consolidation center logic 140, in certain embodiments, may notify an emergency response service of the possible locations/location probability.

Figure 4:
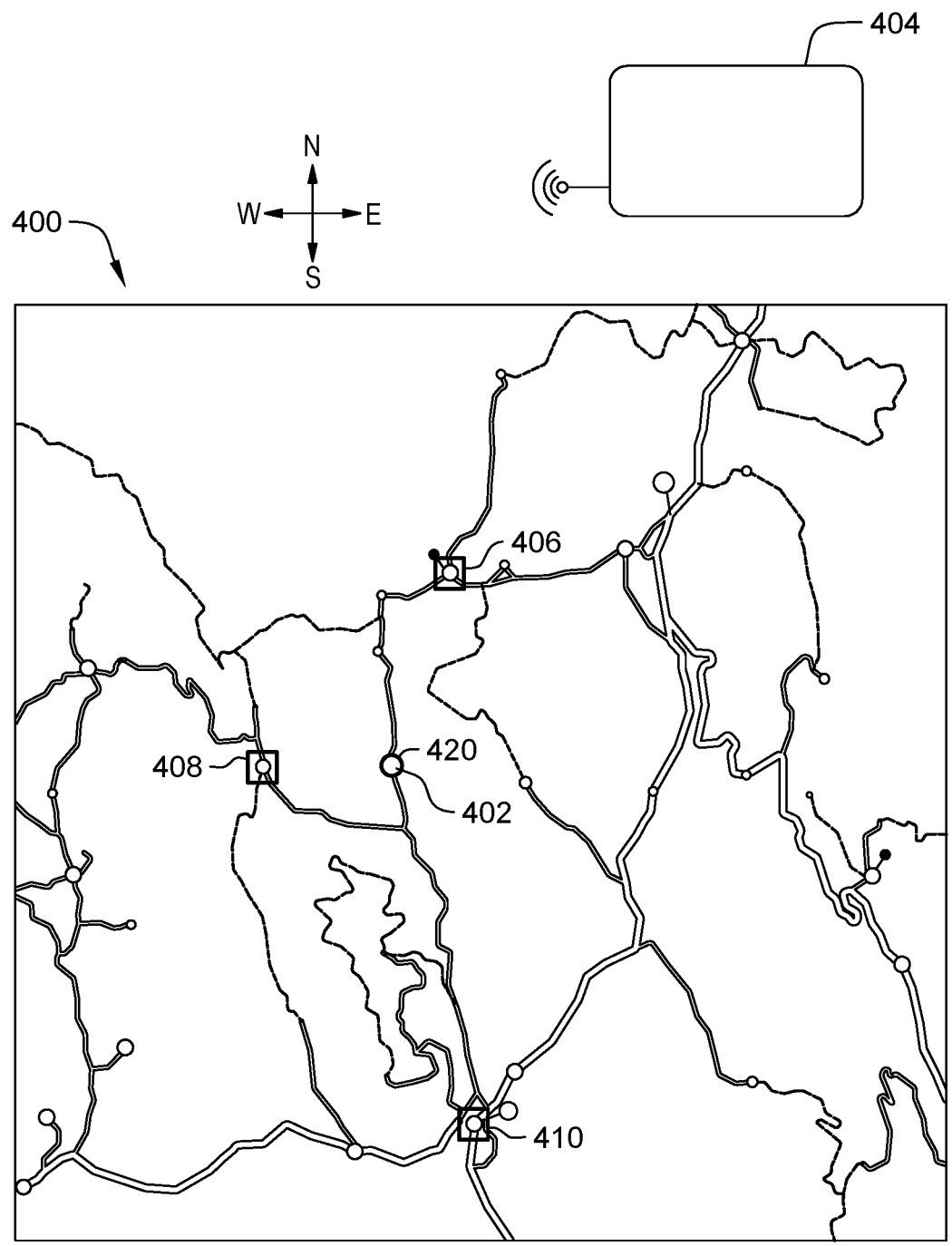
FIGS. 4-9 depict maps of an incident location and a surrounding area being monitored by a consolidation center, in accordance with one embodiment of the present invention.

FIG. 4 depicts a map 400 of an incident location 402 and a surrounding area being monitored by a consolidation center 404, in accordance with one embodiment of the present invention. The map 400 includes a first incident relay device 406, a second incident relay device 408, and a third incident relay device 410 that are fixed at each location and communicate with incident detecting devices traveling through the geography of the map 400. A first incident detection device 420 is located at the incident location 402 and has detected an incident at event time 10:52:44. The first incident detection device 420 broadcasts an alarm message with a device ID, the event time stamp, a distance vector (equal to 0 since the first incident detection device 420 has not moved from the incident location), and a relay number: (DEVICE-1, 10:52:44, {0}, 0). Since the first incident detection device 420 is not in range of any of the incident relay devices 406, 408, 410, the alarm message is not received by the incident relay devices 406, 408, 410 or sent to the consolidation center 404.

Figure 5:
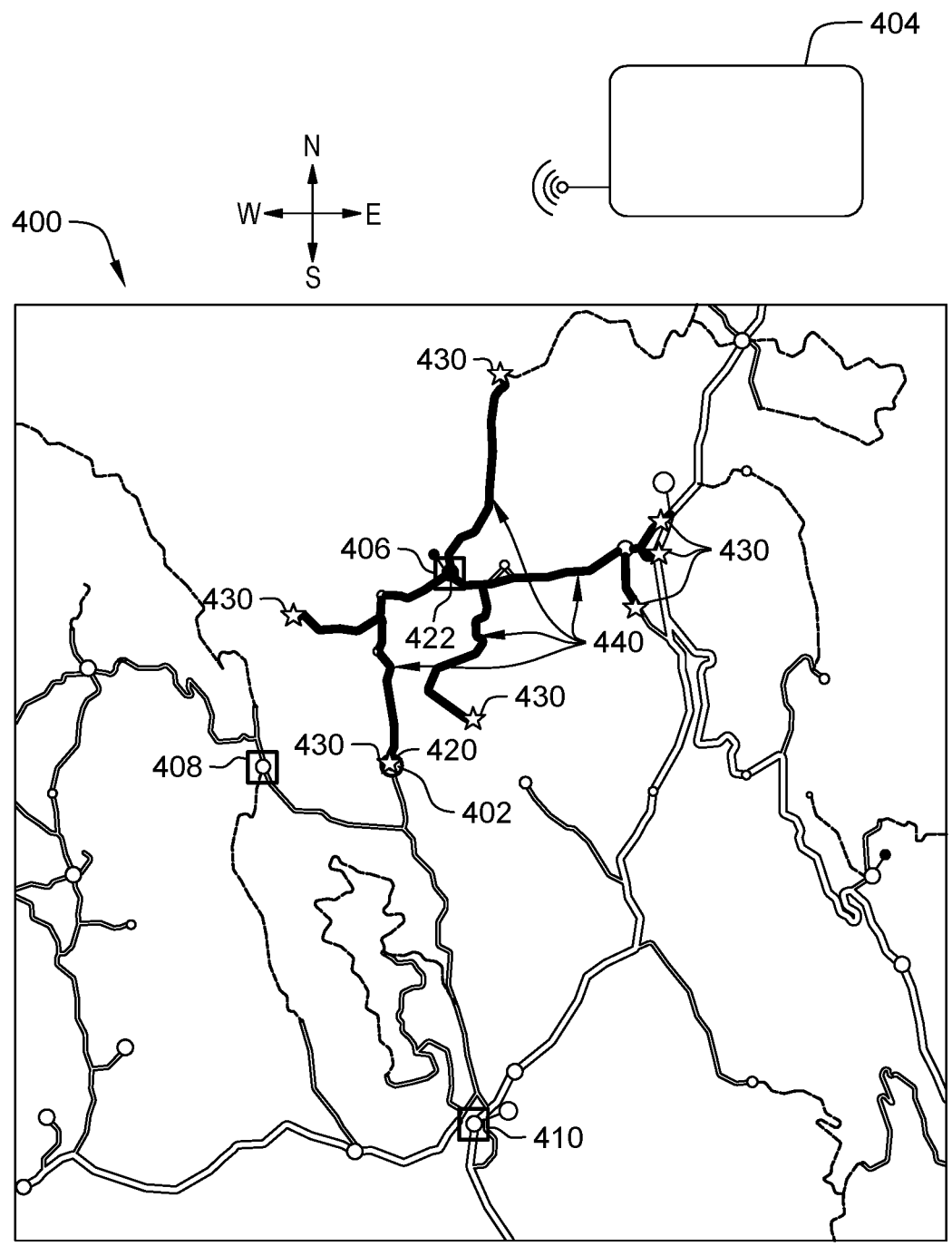

FIG. 5 shows the map 400 including information calculated from an alarm message received from a second incident detection device 422. The second incident detection device 422 received the alarm message from the first incident detection device 420 at the incident location 402, and then traveled (i.e., north) to a location within range of the first incident relay device 406. The second incident detection device 422 broadcasts an updated alarm message: (DEVICE-1, 10:52:44, {0,6}, 1) that is received by the first incident relay device 406 and relayed to the consolidation center 404. The updated distance vector "{0,6}" reflects the 0 kilometer traveled by the first incident detection device 420, and the 6 kilometers that the second incident detection device 422 traveled since receiving the first alarm message. The updated relay number: "1" reflects one increment from the first incident detection device 420 to the second incident detection device 422.

The consolidation center 404 calculates isodistance information from the alarm message of the second incident detection device 422 and calculates seven possible locations 430 for the incident location 402. The possible locations 430 reflect all the locations that are 6 kilometers from the first incident relay device 406 along roads 440 from the first incident relay device 406.

Figure 6:
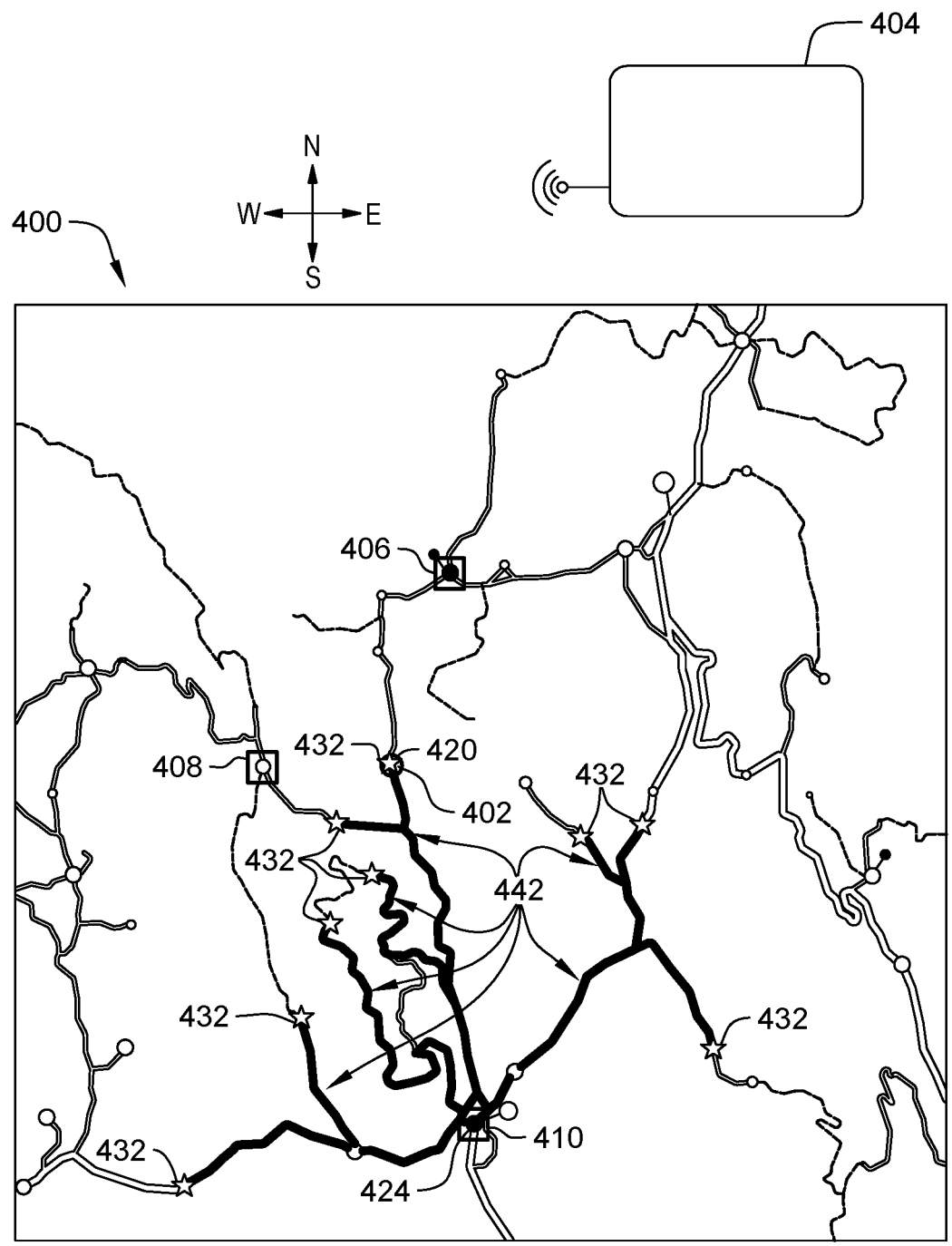

FIG. 6 shows the map 400 of FIG. 4 including information calculated from an alarm message received from a third incident detection device 424 that has passed by the incident location 402 and the first incident detection device 420. The third incident detection device 424 received the alarm message from the first incident detection device 420 (i.e., the same alarm message that the second incident detection device 422 received), and then traveled (i.e., south) to a location within range of the third incident relay device 410. The third incident detection device 424 broadcasts an updated alarm message (DEVICE-1, 10:52:44, {0,10}, 1) that is received by the third incident relay device 410 and relayed to the consolidation center 404. The updated distance vector {0,10} reflects the 0 kilometer traveled by the first incident detection device 420, and the 10 kilometers that the third incident detection device 424 traveled since receiving the first alarm message. The updated relay number: "1" reflects one increment from the first incident detection device 420 to the second incident detection device 422.

The consolidation center 404 calculates isodistance information from the alarm message of the third incident detection device 424 and calculates twelve possible locations 432 for the incident location 402 (nine locations are illustrated in FIG. 6, with three more locations south of the visible area). The possible locations 430 reflect all the locations that are 10 kilometers from the third incident relay device 410 along roads 442 from the third incident relay device 410.

Figure 7:
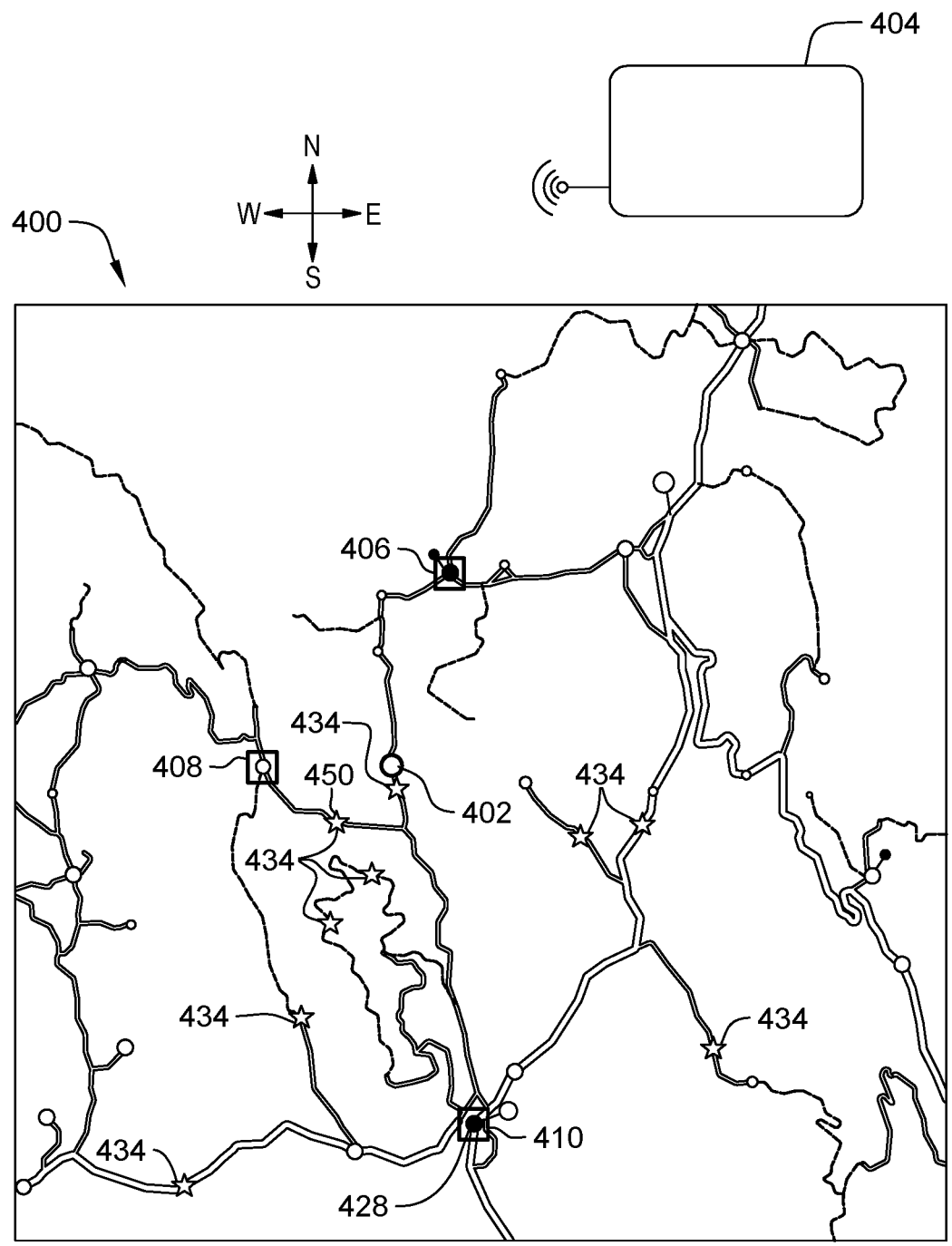

FIG. 7 shows the map 400 of FIG. 4 including information calculated from a relayed alarm message received from a fifth incident detection device 428 that has received an alarm message from a fourth incident detection device 426 passed by the incident location 402 and the first incident detection device 420. The fourth incident detection device 426 received the alarm message from the first incident detection device 420, and then traveled (i.e., south, then west) away from the incident location 402 and broadcasted an updated alarm message (i.e., (DEVICE-1, 10:52:44, {0,3}, 1) to the fifth incident detection device 428 at an overlap location 450. The fifth incident detection device 428 traveled (i.e., east then south) until it is in range of the third incident relay device 410 and broadcasted an updated alarm message (DEVICE-1, 10:52:44, {0,3,9}, 2) that is received by the third incident relay device 410 and relayed to the consolidation center 404. The updated distance vector {0,3,9} reflects the 3 kilometers that the fourth incident detection device 426 traveled since receiving the first alarm message, and the 9 kilometers that the fifth incident detection device 428 traveled since receiving the second alarm message. The updated relay number: "2" reflects two increments 1) from the first incident detection device 420 to the fourth incident detection device 426, and 2) from the fourth incident detection device 426 to the fifth incident detection device 428.

The consolidation center 404 calculates isodistance information from the alarm message of the fifth incident detection device 428 and calculates twelve isodistance points 434 that reflect the points that are 9 kilometers from the third incident relay device 410. While it is thus far hidden to the consolidation center 404, one of the isodistance points 434 is located at the overlap location 450.

Figure 8:
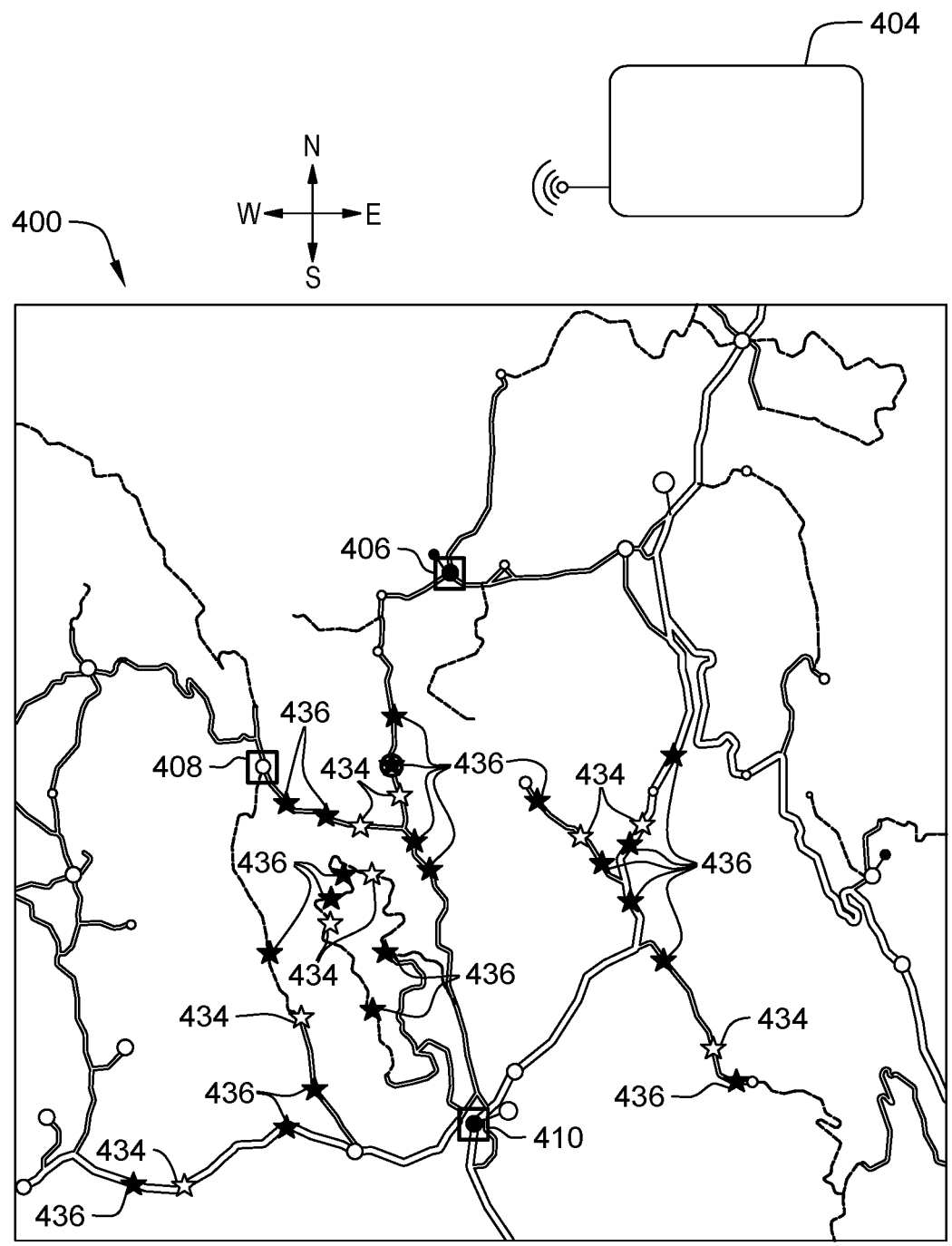

FIG. 8 shows the map 400 of FIG. 4 including further information calculated by the consolidation center 404 to determine the incident location 402. From each isodistance point 434, the consolidation center 404 calculates additional possible locations 436 that reflect the 3 kilometers traveled by the fourth incident detection device 426, as recorded in the distance vector of the relayed alarm message. The additional possible locations may be calculated along a road in any direction from the isodistance points. If more distances had been appended to the distance vector, the consolidation center 404 would further calculate possible locations from the possible location 436 shown in FIG. 8.

In certain embodiments, the consolidation center 404 weighs the possible locations depending on the relay number that was received in the alarm message. For alarm messages having a higher relay number (e.g., alarm message from the fifth incident detection device 428), for instance, the consolidation center 404 will weigh the possible locations (e.g., possible locations 436) less than alarm messages having a lower relay number (e.g., possible locations 430 calculated from the alarm message of the second incident detection device 422).

Figure 9:
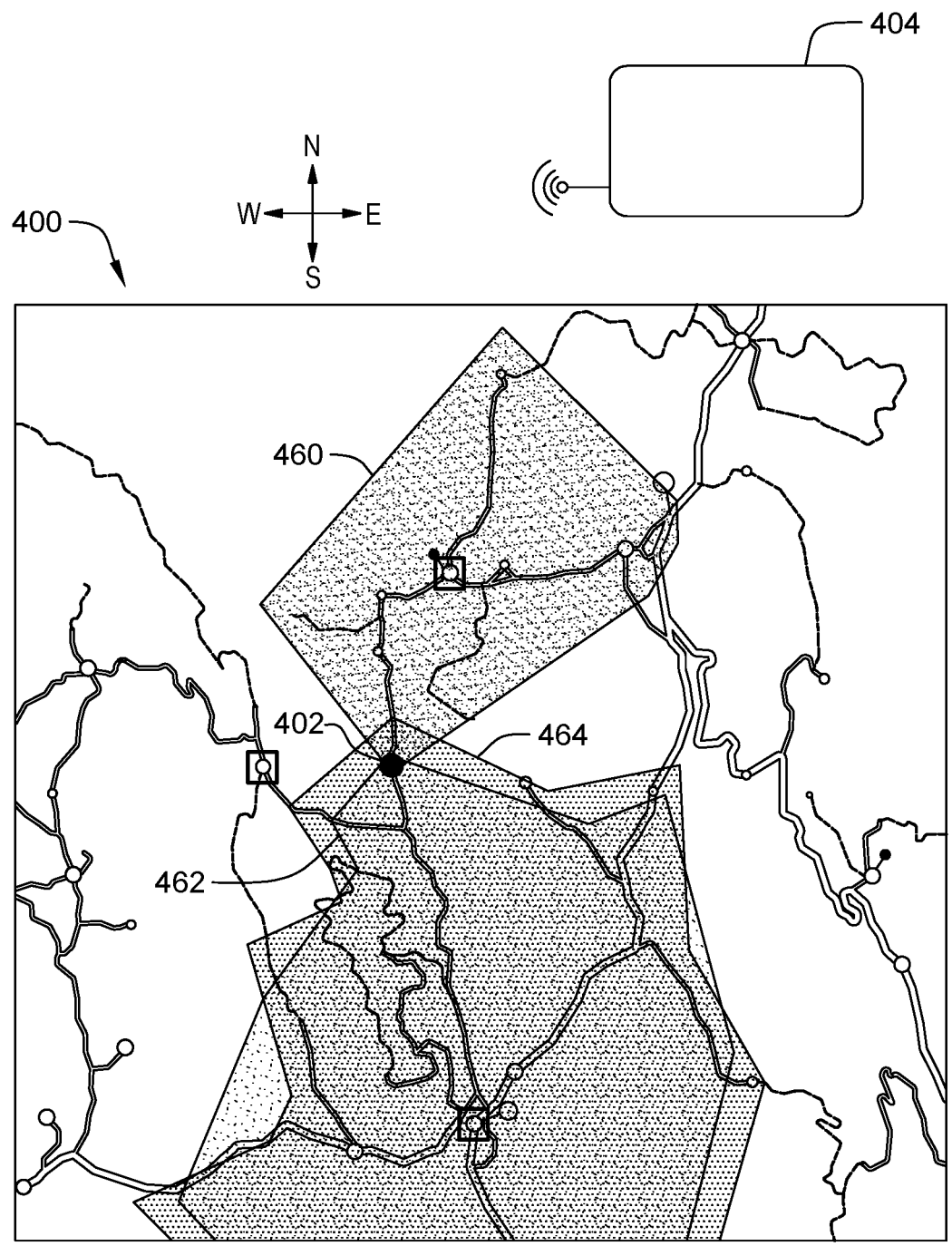

FIG. 9 shows the map 400 of FIG. 4 with the information from the alarm message broadcast by the second incident detection device 422 overlapping the information from the alarm message broadcast by the third incident detection device 424 and the alarm message broadcast by the fifth incident detection device 428. For visual simplicity the possible locations 430, 432, 436 and the isodistance points 434 have been replaced by area blocks 460, 462, 464. The first area block 460 represents the possible locations 430 calculated from the alarm message of the second incident detection device 422; the second area block 462 represents the possible locations 432 calculated from the alarm message of the third incident detection device 424; and the third area block 464 represents the possible locations 436 calculated from the alarm message of the fifth incident detection device 428. From the representation shown in FIG. 9, there is overlap between the three areas 460, 462, 464 at only one point. Using this overlap, the consolidation center 404 calculates, correctly, that the incident occurred at the incident location 402. In certain embodiments, the consolidation center 404 would then notify an emergency response service about the incident location 402.

Figure 10:
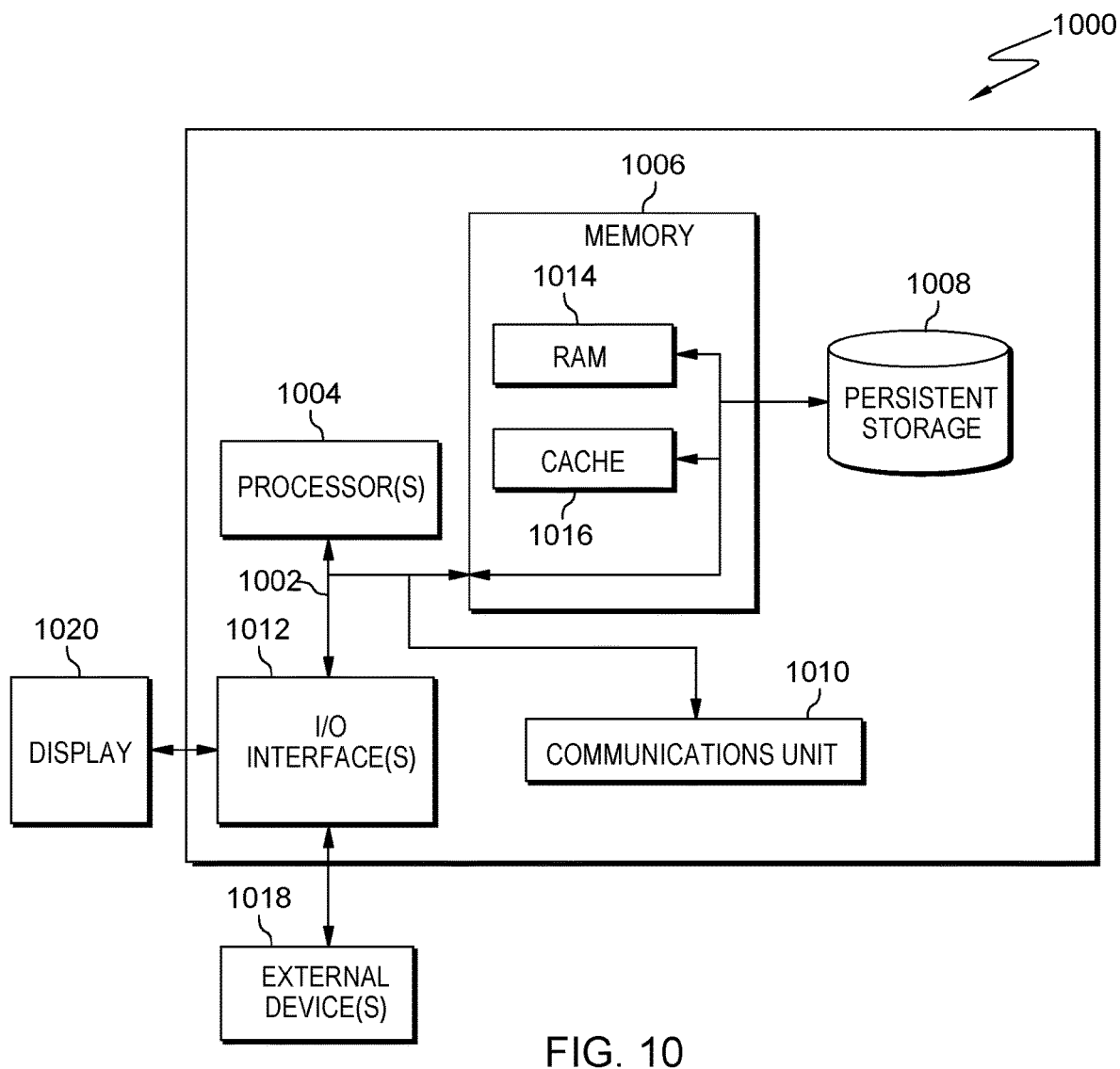
FIG. 10 depicts a block diagram of components of the computing devices in accordance with one embodiment of the present invention.

FIG. 10 depicts a block diagram of components of the incident locating system 100 in accordance with an illustrative embodiment of the present invention. It should be appreciated that FIG. 10 provides only an illustration of one implementation and does not imply any limitations with regard to the environments in which different embodiments may be implemented. Many modifications to the depicted environment may be made.

The incident detection devices 102, incident relay devices 104, and the consolidation center 106 may all include communications fabric 1002, which provides communications between RAM 1014, cache 1016, memory 1006, persistent storage 1008, communications unit 1010, and input/output (I/O) interface(s) 1012. Communications fabric 1002 can be implemented with any architecture designed for passing data and/or control information between processors (such as microprocessors, communications and network processors, etc.), system memory, peripheral devices, and any other hardware components within a system. For example, communications fabric 1002 can be implemented with one or more buses or a crossbar switch.

Memory 1006 and persistent storage 1008 are computer readable storage media. In this embodiment, memory 1006 includes random access memory (RAM). In general, memory 1006 can include any suitable volatile or non-volatile computer readable storage media. Cache 1016 is a fast memory that enhances the performance of computer processor(s) 1004 by holding recently accessed data, and data near accessed data, from memory 1006.

The incident detection logic 116 and the consolidation center logic 140 may be stored in persistent storage 1008 and in memory 1006 for execution and/or access by one or more of the respective computer processors 1004 via cache 1016. In an embodiment, persistent storage 1008 includes a magnetic hard disk drive. Alternatively, or in addition to a magnetic hard disk drive, persistent storage 1008 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 1008 may also be removable. For example, a removable hard drive may be used for persistent storage 1008. Other examples include optical and magnetic disks, thumb drives, and smart cards that are inserted into a drive for transfer onto another computer readable storage medium that is also part of persistent storage 1008.

Communications unit 1010, in these examples, provides for communications with other data processing systems or devices. In these examples, communications unit 1010 includes one or more network interface cards. Communications unit 1010 may provide communications through the use of either or both physical and wireless communications links. The incident detection logic 116, the incident relay logic 126, and the consolidation center logic 140 may be downloaded to persistent storage 1008 through communications unit 1010.

I/O interface(s) 1012 allows for input and output of data with other devices that may be connected to server computer. For example, I/O interface 1012 may provide a connection to external devices 1018 such as a keyboard, keypad, a touch screen, and/or some other suitable input device. External devices 1018 can also include portable computer readable storage media such as, for example, thumb drives, portable optical or magnetic disks, and memory cards. Software and data used to practice embodiments of the present invention (e.g., the incident detection logic 116, the incident relay logic 126, and the consolidation center logic 140) can be stored on such portable computer readable storage media and can be loaded onto persistent storage 1008 via I/O interface(s) 1012. I/O interface(s) 1012 also connect to a display 1020.

Display 1020 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method, comprising:
receiving, at one or more processors, a first alarm message comprising a device identification, an event time stamp indicating detection of an incident, and a first distance vector comprising a first distance traveled by a first incident detection device between a first initiation time and a first transmission time, wherein the first initiation time comprises a time that the first incident detection device received an alarm message from a device associated with the device identification, and that the first transmission time comprises a time that the first incident detection device sent the first alarm message;
calculating, with one or more processors, first isodistance information from the first distance vector;

receiving, at one or more processors, a second alarm message comprising the device identification, the event time stamp, and a second distance vector comprising a distance traveled by a second incident detection device between a second initiation time and a second transmission time;

calculating, with one or more processors, a second isodistance information for the second alarm message; and calculating, with one or more processors, a location of the incident based on the first isodistance information and the second isodistance information.

2. The method of claim 1, wherein receiving the first alarm message comprises receiving the first alarm message from a first incident relay device at a first fixed location.

3. The method of claim 2, wherein receiving the second alarm message comprises receiving the second alarm message from a second incident relay device at a second fixed location.

4. The method of claim 1, wherein the first distance vector comprises a distance traveled by a prior incident detection device between a prior initiation time and a prior transmission time, wherein the prior transmission time indicates transmission from the prior incident detection device to the first incident detection device.

5. The method of claim 1, wherein the first distance vector further comprises an intermediate distance traveled by an intermediate incident detection device between an intermediate initiation time and an intermediate transmission time, wherein the intermediate transmission time indicates transmission from the intermediate incident detection device to a fixed incident relay device.

6. The method of claim 5, wherein calculating the first isodistance information comprises:
  calculating at least one first road position located the intermediate distance away from the incident relay device; and
  calculating at least one second road position located the first distance away from the at least one first road position.

7. The method of claim 1, wherein the first alarm message comprises a first relay number and the second alarm message comprises a second relay number, and wherein calculating a location of the traffic incident comprises weighing the first isodistance information based on the first relay number and weighing the second isodistance based on the second relay number.

8. The method of claim 1, comprising notifying an emergency response service of the location of the traffic incident.

9. A computer program product for calculating a location of a traffic incident, the computer program product comprising:
  one or more computer-readable storage media and program instructions stored on the one or more computer-readable storage media, the program instructions comprising:
    program instructions for receiving, at one or more processors, a first alarm message comprising a device identification, an event time stamp indicating detection of an incident, and a first distance vector comprising a first distance traveled by a first incident detection device between a first initiation time and a first transmission time, wherein the first initiation time comprises a time that the first incident detection device received an alarm message from a device associated with the device identification, and that the first transmission time comprises a time that the first incident detection device sent the first alarm message;
    program instructions for calculating, with one or more processors, first isodistance information from the first distance vector;
    program instructions for receiving, at one or more processors, a second alarm message comprising the device identification, the event time stamp, and a second distance vector comprising a distance traveled by a second incident detection device between a second initiation time and a second transmission time;
    program instructions for calculating, with one or more processors, a second isodistance information for the second alarm message; and
    program instructions for calculating, with one or more processors, a location of the incident based on the first isodistance information and the second isodistance information.

10. The computer program product of claim 9, wherein program instructions for receiving the first alarm message comprise program instructions for receiving the first alarm message from a first incident relay device at a first fixed location.

11. The computer program product of claim 10, wherein program instructions for receiving the second alarm message comprise program instructions for receiving the second alarm message from a second incident relay device at a second fixed location.

12. The computer program product of claim 9, wherein the first distance vector comprises a distance traveled by a prior incident detection device between a prior initiation time and a prior transmission time, wherein the prior transmission time indicates transmission from the prior incident detection device to the first incident detection device.

13. The computer program product of claim 9, wherein the first distance vector further comprises an intermediate distance traveled by an intermediate incident detection device between an intermediate initiation time and an intermediate transmission time, wherein the intermediate transmission time indicates transmission from the intermediate incident detection device to a fixed incident relay device.

14. The computer program product of claim 13, wherein program instructions for calculating the first isodistance information comprise program instructions for:
  calculating at least one first road position located the intermediate distance away from the incident relay device; and
  calculating at least one second road position located the first distance away from the at least one first road position.

15. The computer program product of claim 9, wherein the first alarm message comprises a first relay number and the second alarm message comprises a second relay number, and wherein calculating a location of the traffic incident comprises weighing the first isodistance information based on the first relay number and weighing the second isodistance based on the second relay number.

16. A computer system for calculating a location of a traffic incident, the computer system comprising:
  one or more computer processors, one or more computer-readable storage media, and program instructions stored on the computer-readable storage media for execution by at least one of the one or more processors, the program instructions comprising:

program instructions for receiving, at one or more processors, a first alarm message comprising a device identification, an event time stamp indicating detection of an incident, and a first distance vector comprising a first distance traveled by a first incident detection device between a first initiation time and a first transmission time, wherein the first initiation time comprises a time that the first incident detection device received an alarm message from a device associated with the device identification, and that the first transmission time comprises a time that the first incident detection device sent the first alarm message;

program instructions for calculating, with one or more processors, first isodistance information from the first distance vector;

program instructions for receiving, at one or more processors, a second alarm message comprising the device identification, the event time stamp, and a second distance vector comprising a distance traveled by a second incident detection device between a second initiation time and a second transmission time;

program instructions for calculating, with one or more processors, a second isodistance information for the second alarm message; and program instructions for calculating, with one or more processors, a location of the incident based on the first isodistance information and the second isodistance information.

17. The computer system of claim 16, wherein program instructions for receiving the first alarm message comprise program instructions for receiving the first alarm message from a first incident relay device at a first fixed location.

18. The computer system of claim 17, wherein program instructions for receiving the second alarm message comprise program instructions for receiving the second alarm message from a second incident relay device at a second fixed location.

19. The computer system of claim 16, wherein the first alarm message comprises a first relay number and the second alarm message comprises a second relay number, and wherein calculating a location of the traffic incident comprises weighing the first isodistance information based on the first relay number and weighing the second isodistance based on the second relay number.

20. The computer system of claim 16, comprising program instructions for notifying an emergency response service of the location of the traffic incident.

* * * * *